(12) United States Patent
Bailly et al.

(10) Patent No.: US 8,487,957 B1
(45) Date of Patent: Jul. 16, 2013

(54) DISPLAYING AND NAVIGATING WITHIN PHOTO PLACEMARKS IN A GEOGRAPHIC INFORMATION SYSTEM, AND APPLICATIONS THEREOF

(75) Inventors: Francois Bailly, Mountain View, CA (US); John Rohlf, Campbell, CA (US); Brian McClendon, Menlo Park, CA (US); Andrew Timothy Szybalski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 930 days.

(21) Appl. No.: 12/129,520

(22) Filed: May 29, 2008

Related U.S. Application Data

(60) Provisional application No. 60/940,691, filed on May 29, 2007, provisional application No. 60/940,698, filed on May 29, 2007.

(51) Int. Cl.
*G09G 5/00* (2006.01)

(52) U.S. Cl.
USPC ............ 345/619; 345/629; 345/633; 345/634

(58) Field of Classification Search
None
See application file for complete search history.

(56) References Cited

U.S. PATENT DOCUMENTS

| | | | | |
|---|---|---|---|---|
| 4,737,916 A | * | 4/1988 | Ogawa et al. | 701/200 |
| 5,379,215 A | * | 1/1995 | Kruhoeffer et al. | 702/3 |
| 5,396,431 A | * | 3/1995 | Shimizu et al. | 701/213 |
| 5,566,251 A | * | 10/1996 | Hanna et al. | 382/284 |
| 5,948,040 A | * | 9/1999 | DeLorme et al. | 701/201 |
| 6,037,936 A | * | 3/2000 | Ellenby et al. | 715/764 |
| 6,075,542 A | * | 6/2000 | Fredlund et al. | 715/848 |
| 6,133,947 A | * | 10/2000 | Mikuni | 348/143 |
| 6,182,010 B1 | * | 1/2001 | Berstis | 701/211 |
| 6,195,122 B1 | * | 2/2001 | Vincent | 348/169 |
| 6,360,168 B1 | * | 3/2002 | Shimabara | 701/211 |
| 6,414,696 B1 | * | 7/2002 | Ellenby et al. | 715/762 |
| 6,671,615 B1 | * | 12/2003 | Becker et al. | 701/200 |
| 6,710,740 B2 | * | 3/2004 | Needham | 342/357.46 |
| 6,885,939 B2 | * | 4/2005 | Schmidt et al. | 701/428 |
| 6,904,160 B2 | * | 6/2005 | Burgess | 382/113 |
| 6,914,626 B2 | * | 7/2005 | Squibbs | 348/231.3 |
| 6,914,627 B1 | * | 7/2005 | Dong | 348/248 |
| 7,006,916 B2 | * | 2/2006 | Kawasaki | 701/211 |
| 7,089,264 B1 | * | 8/2006 | Guido et al. | 1/1 |
| 7,209,807 B2 | * | 4/2007 | Smith et al. | 701/1 |
| 7,451,041 B2 | * | 11/2008 | Laumeyer et al. | 701/420 |
| 7,460,953 B2 | * | 12/2008 | Herbst et al. | 701/211 |
| 7,466,244 B2 | * | 12/2008 | Kimchi et al. | 340/995.1 |

(Continued)

OTHER PUBLICATIONS

Snavely et al., Photo Tourism: exploring photo collections in 3D, ACM TRansactions on Graphics (TOG)—Proceedings of ACM SIGGRAPH 2006, vol. 25, issue 3, Jul. 2006, pp. 835-846.*

(Continued)

*Primary Examiner* — M Good Johnson
(74) *Attorney, Agent, or Firm* — Sterne, Kessler, Goldstein & Fox PLLC

(57) ABSTRACT

Embodiments of the present invention relate to displaying and navigating within photo placemarks in a geographic information system. In one embodiment, a computer implemented method displays a photographic image within geographic information in a geographic information system. The photographic image is displayed at a location within the geographic information when the photographic image is located within a field of view of a virtual camera of the geographic information system. In response to a computer input event, the photographic image is displayed in greater detail.

20 Claims, 15 Drawing Sheets

U.S. PATENT DOCUMENTS

| | | | | |
|---|---|---|---|---|
| 7,526,718 | B2* | 4/2009 | Samadani et al. | 715/201 |
| 7,539,572 | B2* | 5/2009 | Kamikawa et al. | 701/207 |
| 7,564,377 | B2* | 7/2009 | Kimchi et al. | 340/995.13 |
| 7,600,191 | B2* | 10/2009 | Yoshikawa et al. | 715/790 |
| 7,610,560 | B2* | 10/2009 | Horvitz et al. | 715/764 |
| 7,711,478 | B2* | 5/2010 | Gluck | 701/208 |
| 7,728,869 | B2* | 6/2010 | Jung | 348/113 |
| 7,813,596 | B2* | 10/2010 | Di Bernardo et al. | 382/305 |
| 7,904,483 | B2* | 3/2011 | Koch et al. | 707/802 |
| 8,026,929 | B2* | 9/2011 | Naimark | 345/629 |
| 8,065,082 | B2* | 11/2011 | Suddreth et al. | 701/436 |
| 8,073,265 | B2* | 12/2011 | Liao et al. | 382/225 |
| 2001/0022621 | A1* | 9/2001 | Squibbs | 348/232 |
| 2002/0075329 | A1* | 6/2002 | Prabhu et al. | 345/854 |
| 2003/0046158 | A1* | 3/2003 | Kratky | 705/14 |
| 2003/0195670 | A1* | 10/2003 | Smith et al. | 701/1 |
| 2004/0004737 | A1* | 1/2004 | Kahn et al. | 358/1.15 |
| 2004/0075697 | A1* | 4/2004 | Maudlin | 345/848 |
| 2004/0128070 | A1* | 7/2004 | Schmidt et al. | 701/211 |
| 2004/0218910 | A1* | 11/2004 | Chang et al. | 386/98 |
| 2005/0012743 | A1* | 1/2005 | Kapler et al. | 345/419 |
| 2005/0280661 | A1* | 12/2005 | Kobayashi et al. | 345/633 |
| 2006/0132482 | A1* | 6/2006 | Oh | 345/419 |
| 2006/0170693 | A1* | 8/2006 | Bethune et al. | 345/568 |
| 2006/0241859 | A1* | 10/2006 | Kimchi et al. | 701/208 |
| 2006/0241860 | A1* | 10/2006 | Kimchi et al. | 701/208 |
| 2006/0253481 | A1* | 11/2006 | Guido et al. | 707/100 |
| 2006/0287815 | A1* | 12/2006 | Gluck | 701/208 |
| 2007/0014488 | A1* | 1/2007 | Chen et al. | 382/294 |
| 2007/0055441 | A1* | 3/2007 | Retterath et al. | 701/200 |
| 2008/0024484 | A1* | 1/2008 | Naimark | 345/419 |
| 2008/0060034 | A1* | 3/2008 | Egnal et al. | 725/105 |
| 2008/0077597 | A1* | 3/2008 | Butler | 707/10 |

OTHER PUBLICATIONS

Torniai et al., Sharing, Discovering and Browsing Photo Collections through RDF geo-metadata, Sematic Web Applications and Perspectives, 3rd Italian Semantic Web Workshop, Dec. 2006, pp. 1-6.*
Counsell et al., Appropriate Symbols and their use in Detailed 3D Cityscape Models, Second Joint European Conference & Exhibition on Geographical INformation, 1996, pp. 212-221.*
Roush, W., "Second Earth," *Technology Review*, Jul./Aug. 2007; 21 pages.
Roush, W., "Killer Maps," *Technology Review*, Oct. 2005; 10 pages.
Snavely, N., et al., "Photo Tourism: Exploring Photo Collections in 3D," *ACM Transactions on Graphics (TOG)*, Jul. 2006; pp. 845-846.
Boulos, M.N.K, "Web GIS in practice III: creating a simple interactive map of England's Strategic Health Authorities using Google Maps API, Google Earth KML, and MSN Virtual Earth Map Control," *International Journal of Health Geographics*, Sep. 21, 2005; pp. 1-10.
Grossner, K., "Is *Google Earth*, "Digital Earth?"—Defining a Vision," Jun. 16, 2006; 13 pages.

* cited by examiner

```
<PhotoOverlay>
  <!-- Feature elements -->
  <name>A typical pyramidal image</name>
  <Camera>
    <longitude>-121</longitude>
    <latitude>37</latitude>
    <altitude>2000</altitude>
    <heading>95</heading>
    <tilt>45</tilt>
    <roll>0</roll>
    <altitudeMode>clampToGround</altitudeMode>
  </Camera>

<!-- Overlay elements -->
  <Icon>
    <!-- TODO(bent) $ not legal in anyURI, create kml type for
       entity-replaceable URI?  or set type to string?
    <href>gigaimage/$[level]/$[x]_$[y].jpg</href>
    -->
    <href>anyURI-permits-URL-chars-only</href>
  </Icon>

<!-- PhotoOverlay elements -->
  <shape>rectangle</shape>
  <ViewVolume>
    <distance>1000</distance>
    <leftFov>-60</leftFov>
    <!-- leftFov < rightFov -->
    <rightFov>60</rightFov>
    <bottomFov>-45</bottomFov>
    <!-- bottomFov < topFov -->
    <topFov>45</topFov>
  </ViewVolume>
  <roll>-15</roll>
  <Point>
    <coordinates>37,-121</coordinates>
  </Point>
  <ImagePyramid>
    <!-- no <existenceMapHref>, so pyramid is non-sparse -->
    <tileSize>256</tileSize>
    <width>65536</width>
    <height>32768</height>
  </ImagePyramid>
</PhotoOverlay>
```

FIG. 5

```
<PhotoOverlay>
    <!-- Feature elements -->
    <name>A multiresolution gigapixel image</name>
    <Camera>
        <longitude>-121</longitude>
        <latitude>37</latitude>
        <altitude>2000</altitude>
        <heading>95</heading>
        <tilt>45</tilt>
        <roll>0</roll>
        <altitudeMode>clampToGround</altitudeMode>
    </Camera>

<!-- Overlay elements -->
    <Icon>
        <!-- Tile server is CGI -->
        <href>gigaimage:bigstuff?lev=$[level]&x=$[x]&y=$[y]</href>
    </Icon>

<!-- PhotoOverlay elements -->
    <shape>rectangle</shape>
    <ViewVolume>
        <distance>1000</distance>
        <leftFov>-60</leftFov>
        <rightFov>60</rightFov>
        <bottomFov>-45</bottomFov>
        <topFov>45</topFov>
    </ViewVolume>
    <roll>-15</roll>
    <Point>
        <coordinates>37,-121</coordinates>
    </Point>
    <ImagePyramid>
        <!-- pyramid is sparse (multi-resolution, for example) so use eMH -->
        <existenceMapHref>bitmap</existenceMapHref>
        <tileSize>256</tileSize>
        <width>65536</width>
        <height>32768</height>
    </ImagePyramid>
</PhotoOverlay>
```

```
                                                                                    1302
<element name="PhotoOverlay" type="kml:PhotoOverlayType"
                             substitutionGroup="kml:Feature"/>
    <complexType name="PhotoOverlayType" final="#all">
        <complexContent>
            <extension base="kml:OverlayType">
                <sequence>
                    <element name="shape"        type="kml:shapeEnum" default="cylinder" minOccurs="0"/>
                    <element name="ViewVolume"   type="kml:ViewVolumeType" minOccurs="0"/>
                    <element name="roll"         type="kml:angle180"  default="0"
                                                                      minOccurs="0"/>
                    <element ref="kml:Point"     minOccurs="0"/>
                    <element name="ImagePyramid" type="kml:ImagePyramidType"
                                                                      minOccurs="0"/>
                </sequence>
            </extension>
        </complexContent>
    </complexType>
```

```
                                                                                    1304
<simpleType name="shapeEnum">
    <restriction base="string">
        <enumeration value="rectangle"/>
        <enumeration value="cylinder"/>
        <enumeration value="sphere"/>
    </restriction>
</simpleType>
```

```
                                                                                    1306
<complexType name="ViewVolumeType">
    <sequence>
        <element name="distance"  type="double"        default="0" minOccurs="0"/>
        <element name="leftFov"   type="kml:angle180"  default="0" minOccurs="0"/>
        <element name="rightFov"  type="kml:angle180"  default="0" minOccurs="0"/>
        <element name="bottomFov" type="kml:angle90"   default="0" minOccurs="0"/>
        <element name="topFov"    type="kml:angle90"   default="0" minOccurs="0"/>
    </sequence>
</complexType>
```

```
                                                                                    1308
<complexType name="ImagePyramidType">
    <sequence>
        <element name="existenceMapHref" type="anyURI" minOccurs="0"/>
        <element name="tileSize"         type="int" default="256" minOccurs="0"/>
        <element name="width"            type="int" minOccurs="0"/>
        <element name="height"           type="int" minOccurs="0"/>
    </sequence>
</complexType>
```

FIG. 13

DISPLAYING AND NAVIGATING WITHIN PHOTO PLACEMARKS IN A GEOGRAPHIC INFORMATION SYSTEM, AND APPLICATIONS THEREOF

This application claims the benefit of U.S. Provisional Appl. No. 60/940,691, filed May 29, 2007, and U.S. Provisional Appl. No. 60/940,698, filed May 29, 2007, and incorporated by reference herein in their entirety.

FIELD OF THE INVENTION

The present invention relates to geographic information systems.

BACKGROUND OF THE INVENTION

A geographic information system is a system for archiving, retrieving and manipulating data that has been indexed according to the data elements' geographic coordinates. The system generally can utilize a variety of data types such as, for example, imagery, maps, and tables. One company involved in developing geographic information system technology is ESRI, which maintains a website at www.gis.com that includes background information on conventional geographic information system technology.

Some geographic information systems include satellite imagery texture mapped to three dimensional terrain. The resolution of the satellite imagery is generally well below the available screen resolution. However, digital cameras are widely available that take photographic images that can meet or exceed screen resolution. Many cameras can take pictures exceeding six megapixels in resolution.

Systems and methods are needed that increase the resolution displayed by geographic information systems.

BRIEF SUMMARY

Embodiments of the present invention relate to displaying and navigating within photo placemarks in a geographic information system. In one embodiment, a computer implemented method displays a photographic image within geographic information in a geographic information system. The photographic image is displayed at a location within the geographic information when the photographic image is located within a field of view of a virtual camera of the geographic information system. In response to a computer input event, the photographic image is displayed in greater detail.

In another embodiment, a geographic information system displays a photographic image within geographic information. The system includes a placemark processor that sends a signal to display the photographic image within the geographic information when the photographic image is located within a field of view of a virtual camera of the geographic information system.

In a third embodiment, a computer implemented method displays a photographic image within geographic information in a geographic information system. The photographic image is displayed three dimensionally at a location within the geographic information when the photographic image is located within a field of view of a virtual camera of the geographic information system. In response to a computer input event, the photographic image is displayed two dimensionally.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and to use the invention.

FIG. 5 illustrates exemplary keyhole markup language (KML) code for a photo placemark object according to an embodiment of the invention.

Figure 12A:
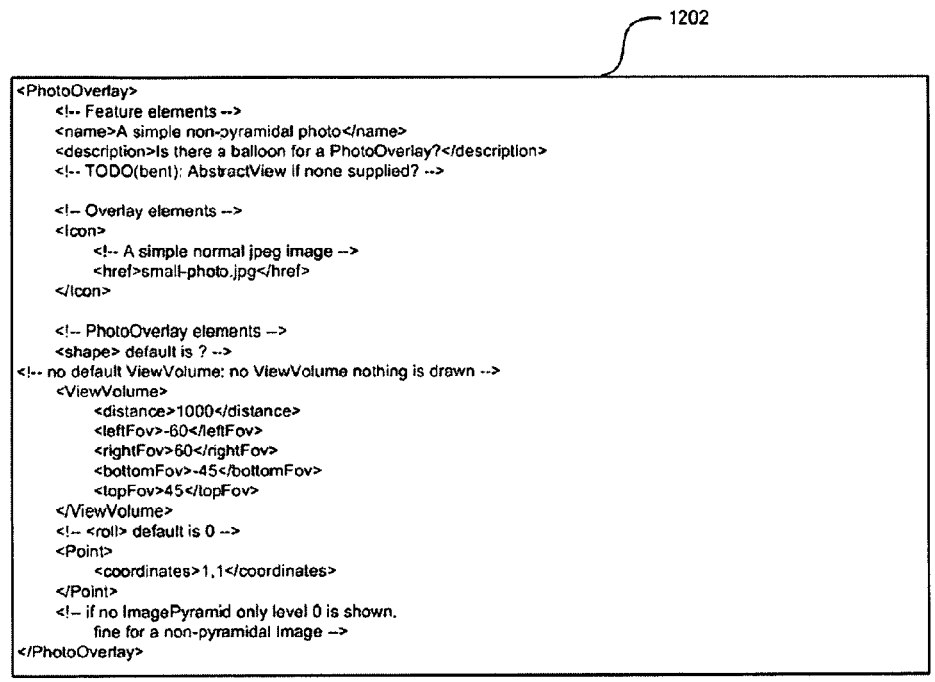

FIGS. 12A-B illustrate exemplary KML code to store photo placemark objects according to an embodiment of the invention.

FIG. 13 illustrates an exemplary KML schema to store a photo placemark object according to an embodiment of the invention.

The present invention is described with reference to the accompanying drawings. The drawing in which an element first appears is typically indicated by the leftmost digit or digits in the corresponding reference number.

DETAILED DESCRIPTION OF EMBODIMENTS

Embodiments of the present invention relate to a geographic information system (GIS) having photo placemarks. Embodiments allow the user to register photographic images in a geographic information system. Once an image is registered, a user can view and share the image. As mentioned earlier, digital cameras commonly take pictures with greater resolution than satellite imagery in a GIS. So, by enabling users to incorporate photographic images into a GIS, embodiments may increase the available image resolution in the GIS.

This Detailed Description is divided into sections. Section one provides a brief overview of photo placemarks. Section two describes a geographic information system client having photo placemarks. Section three describes in detail a method of displaying photo placemarks. Section four describes photo navigation mode using an image pyramid. Finally, section five describes a method of registering photo placemarks in example keyhole markup language (KML).

1. Overview of Photo Placemarks

Figure 1A:
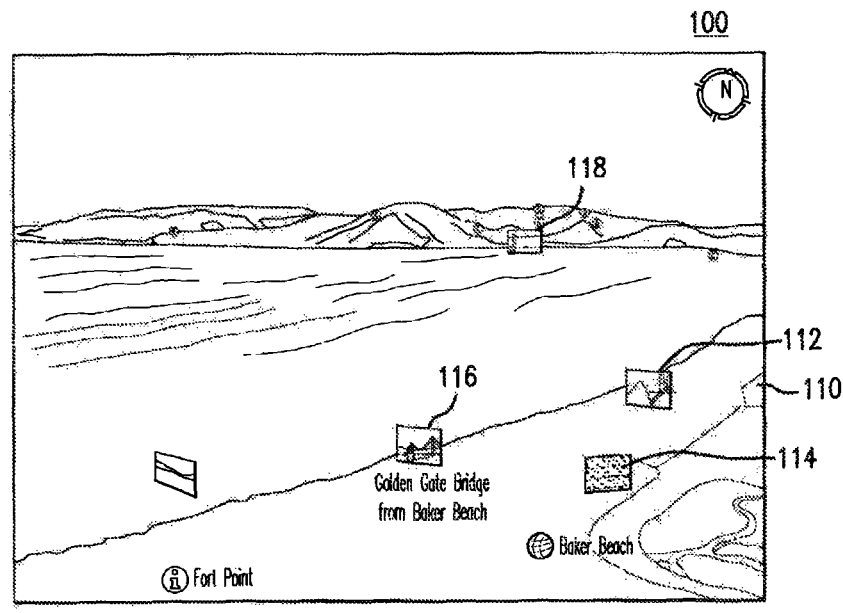
FIG. 1A illustrates exemplary photo placemark objects according to an embodiment of the invention.
Figure 1B:
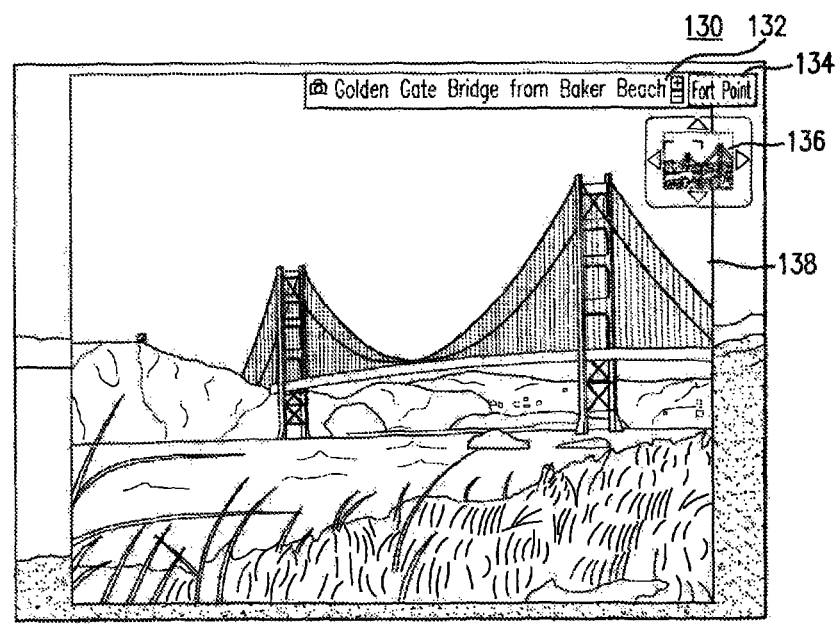
FIG. 1B illustrates a photographic image displayed in photo navigation mode according to an embodiment of the invention.

This section provides a brief overview of photo placemarks. FIG. 1A shows a screenshot 110 illustrating photo placemark objects rendered on a three dimensional map. The three dimensional map may include a three dimensional model of the Earth rendered from the perspective of a virtual camera. Each of the photo placemarks shown in screenshot 110 may be represented as KML objects. The photo placemark objects include billboards corresponding to photographic images such as a billboard 116. When a user selects billboard 116, the user may fly into a photo navigation mode to view the photographic image in greater detail. FIG. 1B shows a screenshot 110 of the photo navigation mode.

Referring to FIG. 1A, photo placemark objects may be rendered differently based on the distance between the virtual camera and a location of the photographic image. When the virtual camera is far from the photo, photo placemark objects are drawn as icons, such as an icon 118, on the three dimensional map. Icons could be, for example, dots, thumb tacks, thumbnail images, or cameras. From afar, these icons indicate where photos are available.

In an embodiment, when the virtual camera is close enough to a photo (e.g. such as when the photo occupies more than five percent of the screen's surface), the photo is drawn as a floating billboard above the Earth, with a frame around it. Screenshot 110 illustrates examples at photo billboards 112 and 116. Photo billboards have a position and orientation within the three dimensional model the GIS. Photo billboards also have a surface. In examples, the surface may be in the shape of a rectangle, cylinder or sphere. A thumbnail of the photographic image may be rendered onto the surface. If the photo faces the direction opposite of the virtual camera, a surface may be rendered without an image. Photo billboard 114 shows an example of a surface without an image.

Mousing over the photo billboard may highlight the picture and gives the hint that the user can click on the picture to interact with it. Screenshot 110 shows an example of a highlighted billboard 116. When selected, photo placemark objects can also have a description balloon that may contain a low-resolution version of their image and a link that invites the user to fly into the picture and browse it (e.g., entering photo navigation mode). In another embodiment, selecting the photo placemark object may immediately fly the user into a photo navigation mode, such as the photo navigation mode shown in FIG. 1B.

FIG. 1B shows a photographic image in photo navigation mode. In an embodiment, flying the user into photo navigation mode effectively moves the virtual camera to a natural origin of the photo. The natural origin is a point in front of the image surface at or slightly beyond the focal length of the camera that took the photo. The virtual camera is oriented normal to the surface, such that the virtual camera is looking into the surface. When a GIS enters photo navigation mode, the GIS may change the focal length and view frustum of the virtual camera to match those of the camera that took the photo.

Screenshot 630 illustrates an example of the display in photo navigation mode. In an embodiment, the display in photo navigation mode may include an photographic image 138, an image title 132, exit button 134, and navigation controls 136. Pressing exit button 134 may exit the user from photo navigation mode. Navigation controls 136 may assist with several navigation operations.

The navigation operations in photo navigation mode may include panning, zooming, autopilot, and joystick motion. Panning drags the image to follow a mouse movement while the mouse button is depressed. Zooming simulates the camera getting closer to the picture. Zooming may result in higher resolution image tiles being displayed from an image pyramid. When the user double clicks on a point, autopilot motion may simulate the camera smoothly centering on the point in the image. Autopilot may zoom in or out depending on which mouse button the user double clicked. Joystick motion uses either the keyboard arrows or a joystick interface to move the view around, for example, at a constant speed.

In an embodiment, a geographic information system client may render and display the photo placemark objects as in FIG. 1A and display a photo in photo navigation mode as in FIG. 1B.

2. Geographic Information System Having Photo Placemarks

This section describes a geographic information system (GIS) client having photo placemarks according to an embodiment of the present invention. A user interface of the GIS client is described with respect to FIG. 2, and a system architecture of the GIS client is described with respect to FIG. 3.

Figure 2:
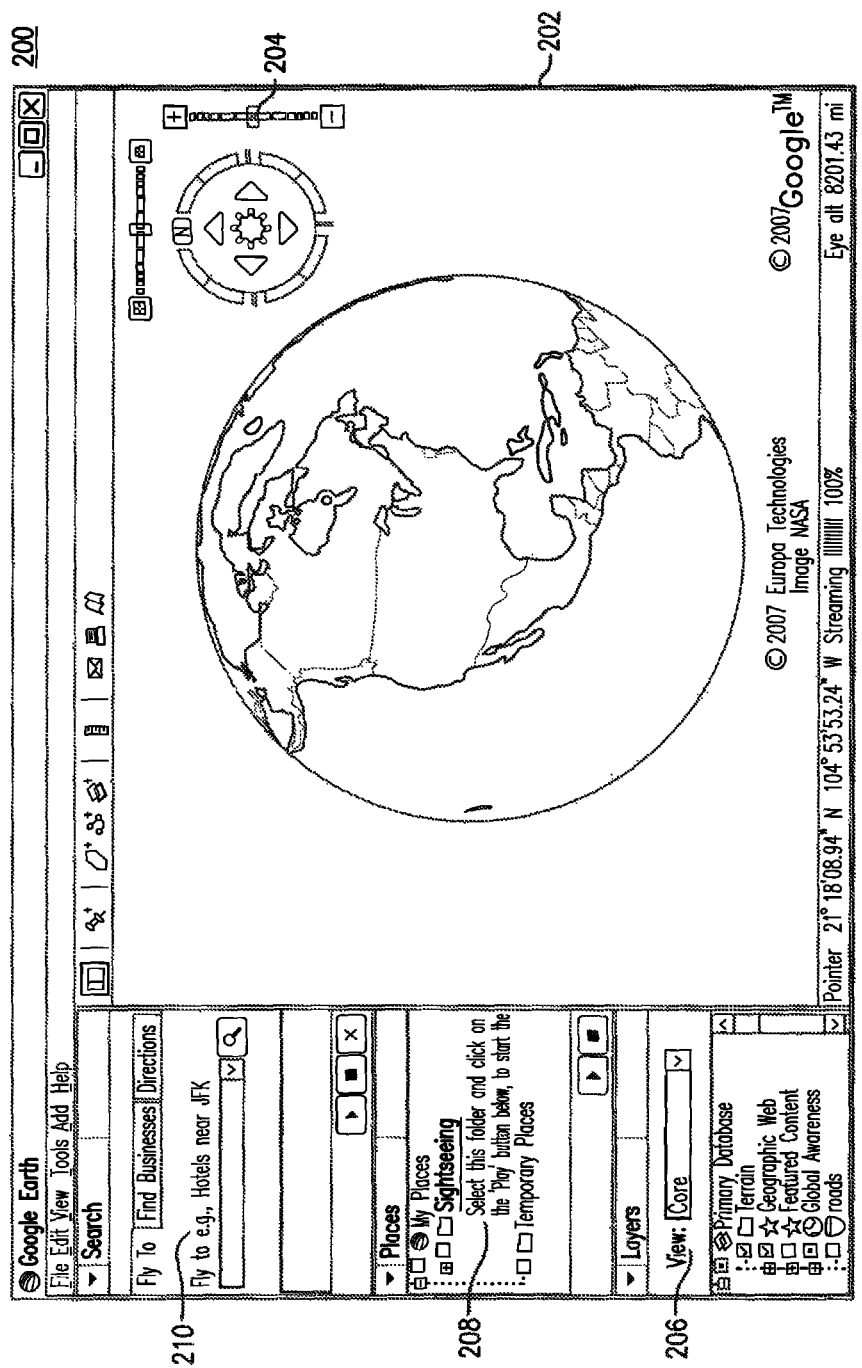
FIG. 2 illustrates an example user interface for a geographic information system according to an embodiment of the invention.

FIG. 2 illustrates an example user interface 200 for a geographic information system (GIS) according to an embodiment of the invention. User interface 200 includes a display area 202 for displaying geographic information/data. The information/data displayed in display area 202 is from the perspective of a virtual camera (not shown). In an embodiment, the perspective is defined by a frustum such as, for example, a three-dimensional pyramid with the top spliced-off. Geographic information/data within the frustum can be displayed at varying levels of detail depending on its distance from the virtual camera.

Example geographic information/data displayed in display area 202 includes images of the Earth. These images can be rendered onto a geometry representing the Earth's terrain. Additional information/data such as information placemarks and photo placemarks can also be displayed, as described in more detail below.

User interface 200 includes controls 204 for changing the virtual camera's orientation. Controls 204 enable a user to change, for example, the virtual camera's altitude, latitude, longitude, pitch and roll. In an embodiment, controls 204 are manipulated using a computer pointing device such as a mouse. As the virtual camera's orientation changes, the virtual camera's frustum and the geographic information/data displayed also change. In addition to controls 204, a user can also control the virtual camera's orientation using other computer input devices such as, for example, a computer keyboard or a joystick.

In an embodiment, user interface 200 includes a layers panel 206 and a places panel 208. These panels enable a user to control/filter the geographic information/data displayed in display area 202. User interface 200 may also contain a search panel 210. Search panel 210 may provide, for example, an ability to fly to a particular geographic location, to search for businesses within a particular geographic area, or to retrieve directions.

In an embodiment, the geographic information system of the present invention can be operated using a client-server computer architecture. In such a configuration, user interface 100 resides on a client machine. The client machine can be a general-purpose computer with a processor, local memory, a display, and one or more computer input devices such as a keyboard, a mouse, touch screen, and/or a joystick. Alternatively, the client machine can be a specialized computing device such as, for example, a mobile handset. The client machine communicates with one or more servers over one or more networks, such as the Internet. Similar to the client machine, the server can be implemented using any general-purpose computer capable of serving data to the client.

Figure 3:
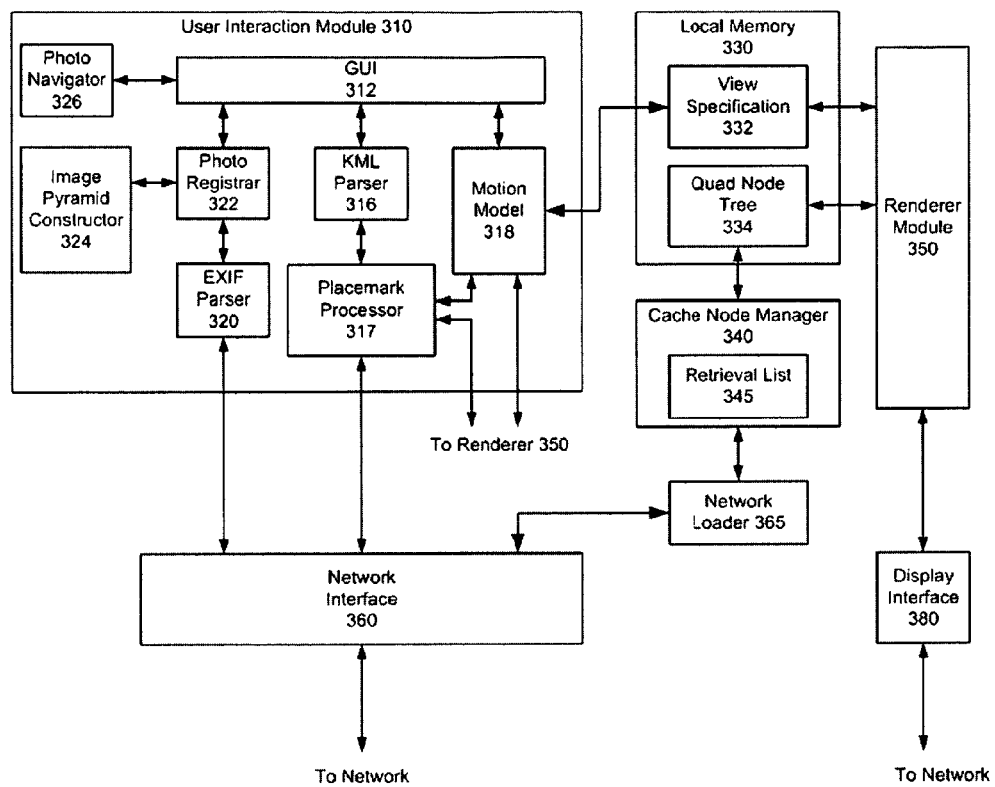
FIG. 3 is an architecture diagram of an exemplary client of a geographic information system according to an embodiment of the invention.

FIG. 3 is an architecture diagram of an exemplary client 300 of a GIS according to an embodiment of the invention. In an embodiment, client 300 includes user interaction module 310, local memory 330, cache node manager 340, renderer module 350, network interface 360, network loader 365, and display interface 380. As shown in FIG. 3, user interaction module 310 includes a graphical user interface (GUI) 312, a KML parser 316, a placemark processor 317, a photo navigator 326, an image pyramid constructor 324, a photo registrar 322, an EXIF parser 320, and a motion model 318. Each of the components of user interaction module 310 may be implemented in hardware, software, firmware or any combination thereof. Local memory 330 includes view specification 332 and quad node tree 334. Cache node manager 340 includes a retrieval list 345.

In an embodiment, the components of client 300 can be implemented, for example, as software running on a client machine. Client 300 interacts with a GIS server (not shown) to bring images of the Earth and other geospatial information/data to client 300 for viewing by a user. In an embodiment, software objects are grouped according to functions that can run asynchronously (e.g., time independently) from one another.

In general, client 300 operates as follows. User interaction module 310 receives user input regarding a location that a user desires to view and, through motion model 318, constructs view specification 332. Renderer module 350 uses view specification 332 to decide what data is to be drawn and draws the data. Cache node manager 340 runs in an asynchronous thread of control and builds a quad node tree 334 by populating it with quad nodes retrieved from a remote server via a network.

In an embodiment of user interaction module 310, a user inputs location information using GUI 312. This results, for example, in the generation of view specification 332. View specification 332 is placed in local memory 330, where it is used by renderer module 350.

KML parser 316 parses KML files. KML files, which are described in more detail below, contain geographic information that can be displayed, for example, overtop a three dimensional map. Creating a KML file is described in more detail below.

Placemark processor 317 processes geographic information contained in a KML file. Placemark processor 317 determines, for example, how to display geographic information based on input from motion model 318. The resulting determination is added to a task list for renderer module 350. Placemark processor 317 may determine that a photo placemark object needs to be displayed as a billboard or an icon depending on the distance of photo from the virtual camera. Accordingly, placemark processor 317 sends the determination and location information (e.g., coordinates, heading, tilt, and roll) to the task list for renderer module 350. Using that information, renderer module 350 may render the photo placemark object. An example operation of placemark processor 317 is described in section three.

As discussed earlier with respect to FIG. 1B, when a user selects a photo placemark object, the user may be transitioned into a photo navigation mode. Photo navigator 326 displays the photographic image in photo navigation mode. When the user selects a photo placemark object, photo navigator 326 may fly the virtual camera to a position to view the photo. The position may be normal to a surface of the photographic image at a distance corresponding to a focal length associated with the photo. Photo navigator 326 may adjust a field of view of the virtual camera to match a field of view of the photographic image.

Photo navigator 326 may render the photo onto one of several different shapes, including cylindrical panoramas, spherical panoramas, or rectangles. In response to a user input photo navigator 326 may execute navigation operations, including palming, autopilot, and joystick motion. Photo navigator 326 may also zoom into the photo in response to a user input. In an example, photo navigator 326 may zoom into the photo by retrieving higher resolution images from an image pyramid constructed from the photo.

Image pyramid constructor 324 optionally determines an image pyramid for a photographic image. The image pyramid may be, for example, determined when a photo is registered. How image pyramid constructor 324 determines the image pyramid is discussed below in section four.

Photo registrar 322 creates a KML representation of a photo placemark object. Photo registrar 322 determines a location of the photographic image, determines a distance value of the photographic image, and determines a field of view the photographic image. Photo registrar 322 may determine the values by accepting a user input in, for example, a form displayed in the GUI. Photo registrar 322 also may determine the values by communicating with exchangeable image file format (EXIF) parser 320 to parse EXIF headers from the photographic image. Photo registrar 322 may store the location, image pyramid, distance value and field of view in a KML file. An example operation of photo registrar 322 is discussed below in section five.

Many photographs taken from digital cameras have metadata about the photo embedded in their image file in EXIF headers. Data may be extracted from the EXIF headers and used to generate either complete or partial KML tags. Data extracted from the EXIF headers may include focal length, image size, image resolution in DPI (dots per inch), focal plane resolution in DPI, and camera make and model.

Motion model 318 uses location information received via GUI 312 to adjust the position and/or orientation of a virtual camera. The camera is used, for example, for viewing a displayed three dimensional map. A user sees a displayed three dimensional map on his or her computer monitor from the standpoint of the virtual camera. In an embodiment, motion model 318 also determines view specification 332 based on the position of the virtual camera, the orientation of the virtual camera, and the horizontal and vertical fields of view of the virtual camera.

View specification 332 defines the virtual camera's viewable volume within a three dimensional space, known as a frustum, and the position and orientation of the frustum with respect, for example, to a three dimensional map. In an embodiment, the frustum is in the shape of a truncated pyramid. The frustum has minimum and maximum view distances that can change depending on the viewing circumstances. As a user's view of a three dimensional map is manipulated using GUI 312, the orientation and position of the frustum changes with respect to the three dimensional map. Thus, as user input is received, view specification 332 changes. View specification 332 is placed in local memory 330, where it is used by renderer module 350.

In accordance with one embodiment of the present invention, view specification 332 specifies three main parameter sets for the virtual camera: the camera tripod, the camera lens, and the camera focus capability. The camera tripod parameter set specifies the following: the virtual camera position: X, Y, Z (three coordinates); which way the virtual camera is oriented relative to a default orientation, such as heading angle (e.g., north?, south?, in-between?); pitch/tilt (e.g., level?, down?, up?, in-between?); and yaw/roll (e.g., level?, tilt clockwise?, tilt anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In one example operation, and with the above camera parameters in mind, assume the user presses the left-arrow (or right-arrow) key. This would signal motion model 318 that the view should move left (or right). Motion model 318 implements such a ground level "pan the camera" type of control by adding (or subtracting) a small value (e.g., 1 degree per arrow key press) to the heading angle. Similarly, to move the virtual camera forward, the motion model 318 would change the X, Y, Z coordinates of the virtual camera's position by first computing a unit-length vector along the view direction (HPR) and adding the X, Y, Z sub-components of this vector to the camera's position after scaling each sub-component by the desired speed of motion. In these and similar ways, motion model 318 adjusts view specification 332 by incrementally updating XYZ and HPR to define the "just after a move" new view position.

As noted herein, renderer module 350 may contain a task list. The task list provides a queue of drawable data to draw. The rendering operations may include, for example, rendering geographic information from KML. According to a feature, the geographic information may include photo placemarks or photos.

Renderer module 350 has cycles corresponding to the display device's video refresh rate (e.g., 60 cycles per second). In one particular embodiment, renderer module 350 performs a cycle of (i) waking up, (ii) reading the view specification 332 that has been placed by motion model 318 in a data structure accessed by renderer module 350, (iii) traversing quad node tree 334 in local memory 330, and (iv) drawing drawable data contained in the quad nodes residing in quad node tree 334. The drawable data may be associated with a bounding box (e.g., a volume that contains the data or other such identifier). If present, the bounding box is inspected to see if the drawable data is potentially visible within view specification 332. Potentially visible data is drawn, while data known not to be visible is ignored. Thus, renderer module 350 uses view specification 332 to determine whether the drawable payload of a quad node resident in quad node tree 334 is not to be drawn, as will now be more fully explained.

Initially, and in accordance with one embodiment of the present invention, there is no data within quad node tree 334 to draw, and renderer module 350 draws a star field by default (or other suitable default display imagery). Quad node tree 334 is the data source for the drawing that renderer module 350 does except for this star field. Renderer module 350 traverses quad node tree 334 by attempting to access each quad node resident in quad node tree 334. Each quad node is a data structure that has up to four references and an optional payload of data. If a quad node's payload is drawable data, renderer module 350 will compare the bounding box of the payload (if any) against view specification 332, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, renderer module 350 also attempts to access each of the up to four references in the quad node. If a reference is to another quad node in local memory (e.g., local memory 330 or other local memory), renderer module 350 will attempt to access any drawable data in that other quad node and also potentially attempt to access any of the up to four references in that other quad node. The renderer module's attempts to access each of the up to four references of a quad node are detected by the quad node itself.

As previously explained, a quad node is a data structure that may have a payload of data and up to four references to other files, each of which in turn may be a quad node. The files referenced by a quad node are referred to herein as the children of that quad node, and the referencing quad node is referred to herein as the parent. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., on server(s) of the GIS), and there is no drawable data present on the user's computer.

Quad nodes and cache nodes have built-in accessor functions. As previously explained, renderer module 350's attempts to access each of the up to four references of a quad node are detected by the quad node itself. Upon the attempt of renderer module 350 to access a child quad node that has a filename but no corresponding address, the parent quad node places (e.g., by operation of its accessor function) that filename onto a cache node retrieval list 345. The cache node retrieval list comprises a list of information identifying cache nodes to be downloaded from a GIS server. If a child of a quad node has a local address that is not null, renderer module 350 uses that address in local memory 330 to access the child quad node.

Quad nodes are configured so that those with drawable payloads may include within their payload a bounding box or other location identifier. Renderer module 350 performs a view frustum cull, which compares the bounding box/location identifier of the quad node payload (if present) with view specification 332. If the bounding box is completely disjoint from view specification 332 (e.g., none of the drawable data is within the frustum), the payload of drawable data will not be drawn, even though it was already retrieved from a GIS server and stored on the user's computer. Otherwise, the drawable data is drawn.

The view frustum cull determines whether or not the bounding box (if any) of the quad node payload is completely disjoint from view specification 332 before renderer module 350 traverses the children of that quad node. If the bounding box of the quad node is completely disjoint from view specification 332, renderer module 350 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from view specification 332.

Quad node and cache node payloads may contain data of various types. For example, cache node payloads can contain satellite images, text labels, political boundaries, 3-dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent. This will be explained further in the context of image pyramids.

In an embodiment, cache node manager 340 and network loader 365 may carry out processes in different threads. For instance, a cache node manager 340 thread, and each of one or more network loader 365 threads may operate asynchronously from renderer module 350 and user interaction module 310. Renderer module 350 and user interaction module 310 can also operate asynchronously from each other. In some embodiments, as many as eight network loader 365 threads are independently executed, each operating asynchronously from renderer module 350 and user interaction module 310. The cache node manager 340 thread builds quad node tree 334 in local memory 330 by populating it with quad nodes retrieved from GIS server(s). Quad node tree 334 begins with a root node when the client system is launched or otherwise started. The root node contains a filename (but no corresponding address) and no data payload. As previously described, this root node uses a built-in accessor function to self-report to the cache node retrieval list 345 after it has been traversed by renderer module 350 for the first time.

In each network loader 365 thread, a network loader traverses the cache node retrieval list 345 (which in the embodiment shown in FIG. 3 is included in cache node manager 340, but can also be located in other places, such as the local memory 330 or other storage facility) and requests the next cache node from the GIS server(s) using the cache node's filename. Network loader 365 only requests files that appear on cache node retrieval list 345. Cache node manager 340 allocates space in local memory 330 (or other suitable storage facility) for the returned file, which is organized into one or more new quad nodes that are descendents of the parent quad node. Cache node manager 340 can also decrypt or decompress the data file returned from the GIS server(s), if necessary (e.g., to complement any encryption or compression on the server-side). Cache node manager 340 updates the parent quad node in quad node tree 334 with the address corresponding to the local memory 330 address for each newly constructed child quad node.

Separately and asynchronously in renderer module 350, upon its next traversal of quad node tree 334 and traversal of the updated parent quad node, renderer module 350 finds the address in local memory corresponding to the child quad node and can access the child quad node. The renderer module 350's traversal of the child quad node progresses according to the same steps that are followed for the parent quad node. This continues through quad node tree 334 until a node is reached that is completely disjoint from view specification 332 or is considered inappropriate to draw based on other factors as previously explained.

In this particular embodiment, note that there is no communication between the cache node manager thread and renderer module 350 other than the renderer module's reading of the quad nodes written or otherwise provided by the cache node manager thread. Further note that, in this particular embodiment, cache nodes and thereby quad nodes continue to be downloaded until the children returned contain only payloads that are completely disjoint from view specification 332 or are otherwise unsuitable for drawing, as previously explained. Network interface 360 (e.g., a network interface card or transceiver) is configured to allow communications from the client to be sent over a network, and to allow communications from the remote server(s) to be received by the client. Likewise, display interface 380 (e.g., a display interface card) is configured to allow data from a mapping module to be sent to a display associated with the user's computer, so that the user can view the data. Each of network interface 360 and display interface 380 can be implemented with conventional technology.

3. Displaying Photo Placemarks

Figure 4:
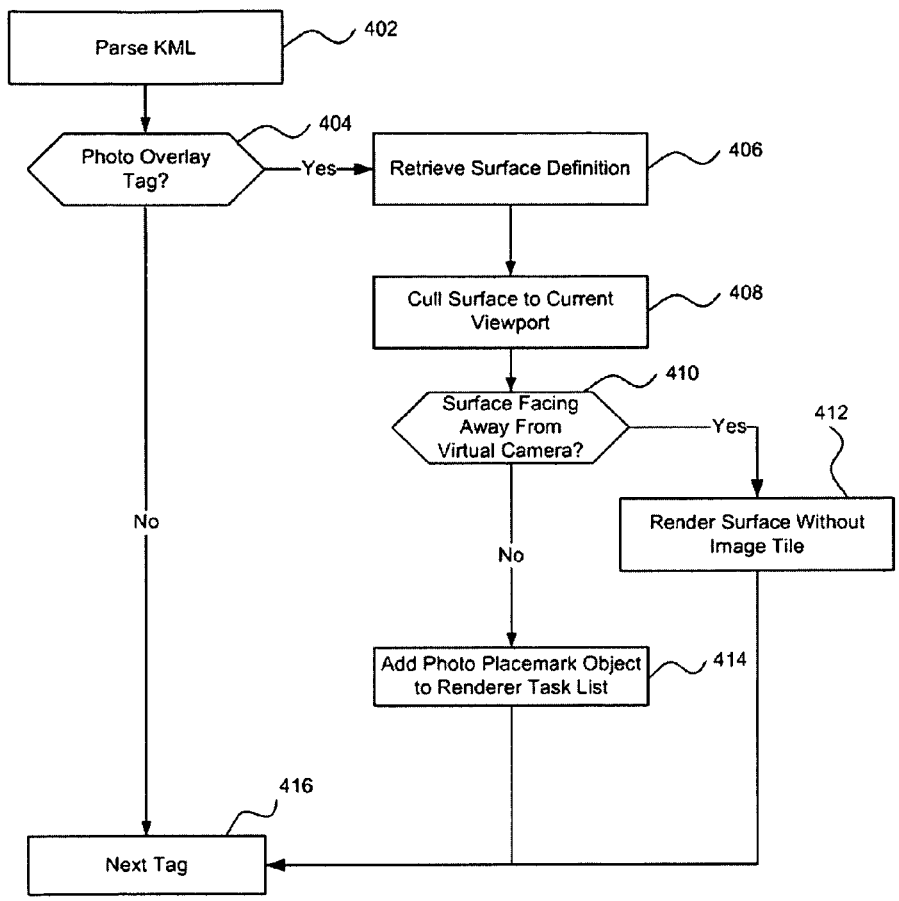
FIG. 4 is a flowchart illustrating an exemplary process by which a client adds photo placemark objects to a geographic information system rendering list according to an embodiment of the invention.

This section describes in detail a method for displaying photo placemark objects. FIG. 4 is a flowchart illustrating a method for displaying photo placemarks from a KML file. An example KML file is shown in FIG. 5. FIG. 6 illustrates how the photo placemark objects may be oriented according to parameters of the KML file. Finally, photo navigation mode is described in more detail with respect to FIGS. 7A-D.

FIG. 4 is a flowchart illustrating an exemplary process by which a client adds photo placemark objects to a renderer task list according to an embodiment of the invention. The process begins at step 402. At step 402, a KML file is parsed. In an embodiment, step 402 may be executed by KML parser 316. KML parser 316 interprets a KML file, an example of which is shown in FIG. 5, to find the data values and to put them in a usable form. KML data is organized into tags. One such tag is a Photo Overlay tag.

Whether a tag is a PhotoOverlay tag is determined at step 404. If the tag is not a PhotoOverlay tag, then control proceeds to step 416 where the next tag is processed. Otherwise, control proceeds to step 406. At step 406, the surface definition is retrieved. The surface definition may include the position and orientation of the frustum, field of view values defining clipping planes of the frustum, and a distance between the frustum's origin and surface (focal length).

The surface of a photo placemark is culled to the current viewport at step 408. In other words, the photo placemark is selected for rendering if it is within the perspective of the virtual camera. At step 410, a determination is made whether a surface is facing away from the virtual camera. If the surface is facing away from the virtual camera, control passes to step 412, and the surface may be rendered without an image tile. Otherwise, control passes to step 414. At step 414, the surface definition data is added to the render module's task list. Renderer module 350, for example, uses this information to render a photo placemark object. At step 416, the next KML tag to be processed is selected.

FIG. 5 illustrates exemplary KML code for a photo placemark object according to an embodiment of the invention. The interactive GIS described herein supports a number of display features for rich presentation of GIS data. In an embodiment, all of the features supported by a GIS can be described in KML. KML is a hierarchical XML-based grammar and file format for modeling, storing, and displaying geographic features such as points, lines, images, and polygons for display by the client. KML may control elements that appear in the user interface and the places panel (shown in FIG. 2).

The KML tag that represents a photo placemark object may be referred to as a PhotoOverlay tag. KML code portion 502 defines several elements of the PhotoOverlay tag. These elements include a shape element, a ViewVolume element, and an ImagePyramid element.

The shape element defines the shape on which to render the surface. The ViewVolume element contains sub-elements necessary to construct a frustum. The ImagePyramid element contains sub-elements necessary to construct an image pyramid. Each of these elements is described in more detail with respect to FIG. 13.

In accordance with one particular embodiment, the GIS client may download one or more KML files from the GIS server(s) when presenting GIS data. In addition, the client can download KML files from other servers on a network. Moreover, an end-user can use the client to create KML files and optionally share the files with the server(s) and/or other clients via the a network and/or other means. Creating KML files is described in more detail in section five.

In one embodiment, files containing KML are encoded in a default file format referred to as "KMZ." KMZ is a compressed file format and in one embodiment uses compression based on the common ZIP file formats. Other compression schemes can be used as well. A single KMZ file can contain one or more constituent files that are extracted when the KMZ file is utilized. A benefit of using KMZ is that all of the images and other data utilized to create a particular presentation of GIS data are self-contained within a single file that can be easily shared among the GIS server(s) and client.

KML can be authored in a number of ways, depending upon the desired purpose. Particular examples include using a text editor, using the client, using a development environment to generate KML programmatically, and by extracting data from an image file.

A text editor can be used to create KML as a way to create file prototypes, or to test out the validity of a particular KML document syntax or structure. For quick KML syntax checking in accordance with one particular embodiment, one can right-click on a placemark or overlay in GUI 312 and select "copy" from the pop-up menu. Next, open a text document and paste the KML contents into it to view the KML generated by the client.

In an embodiment, a development environment may be used to generate KML programmatically. Any favored development environment can be used to author KML content for delivery via the web, much in the same way that other dynamic web content is created. Most content editors that display XML data can do the same for KML.

KML can be used: (1) to specify icons and labels to identify locations on the planet (or other target area) surface; (2) to create different camera positions; (3) to define unique views; (4) to use image overlays attached to the ground or screen; (5) to define styles to specify feature appearance; (6) to write HTML descriptions of features-including hyperlinks and embedded images; (7) to use folders for hierarchical grouping of features; (8) to fetch dynamically other KML files from remote or local network locations; (9) to deliver current view details from the client to the server in order to fetch KML data based on changes in the three dimensional viewer; or (10) to specify a PhotoOverlay or a photo placeholder object.

The frustum specified by KML code 502 is defined in the "ViewVolume" element. In the example shown, the distance between the frustum's origin and surface (the focal length) is set to 1000. The angles of the frustum's left and right clipping planes are set to 60 degrees. The angles of the frustum's top and bottom clipping planes are set to 45 degrees.

KML code 502 defines a location of the photo placemark object in a Camera tag. The Camera tag specifies the location by setting the longitude, latitude, altitude, heading, tilt, heading, and roll. These parameters is described with respect to FIGS. 6A-C.

Figure 6A:
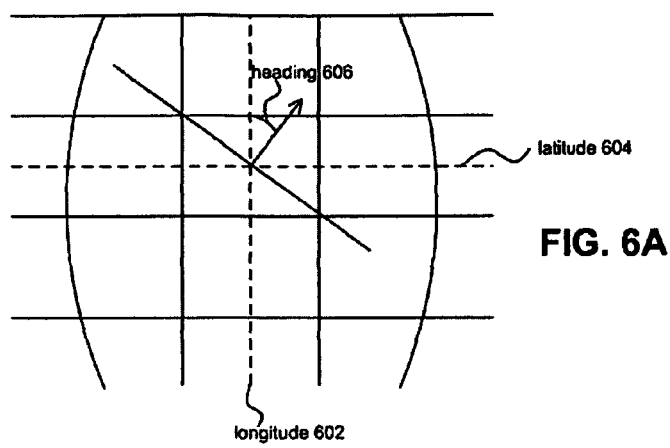
FIGS. 6A-6C illustrate exemplary position and orientation parameters for a photo placemark object according to an embodiment of the invention.
Figure 6B:
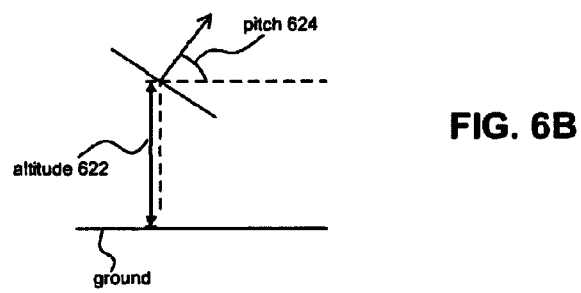
Figure 6C:
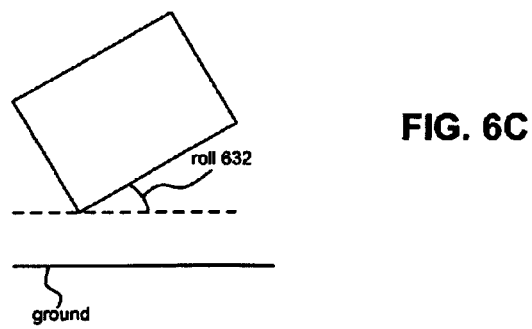

FIGS. 6A-6C illustrate exemplary position and orientation parameters for a photo placemark object according to an embodiment of the invention. For example, FIG. 6A shows a photo placemark object positioned at the coordinate defined by a latitude 604 and longitude 602. The photo placemark object has a heading 606. FIG. 6B shows a photo placemark object with an altitude 622 and pitch 624. Pitch 624 may be defined by the tilt parameter in a Camera tag of a KML code. FIG. 6C shows a photo placemark object with a roll 632. These examples are for purposes of illustration only and not intended to limit the invention.

Figure 7A:
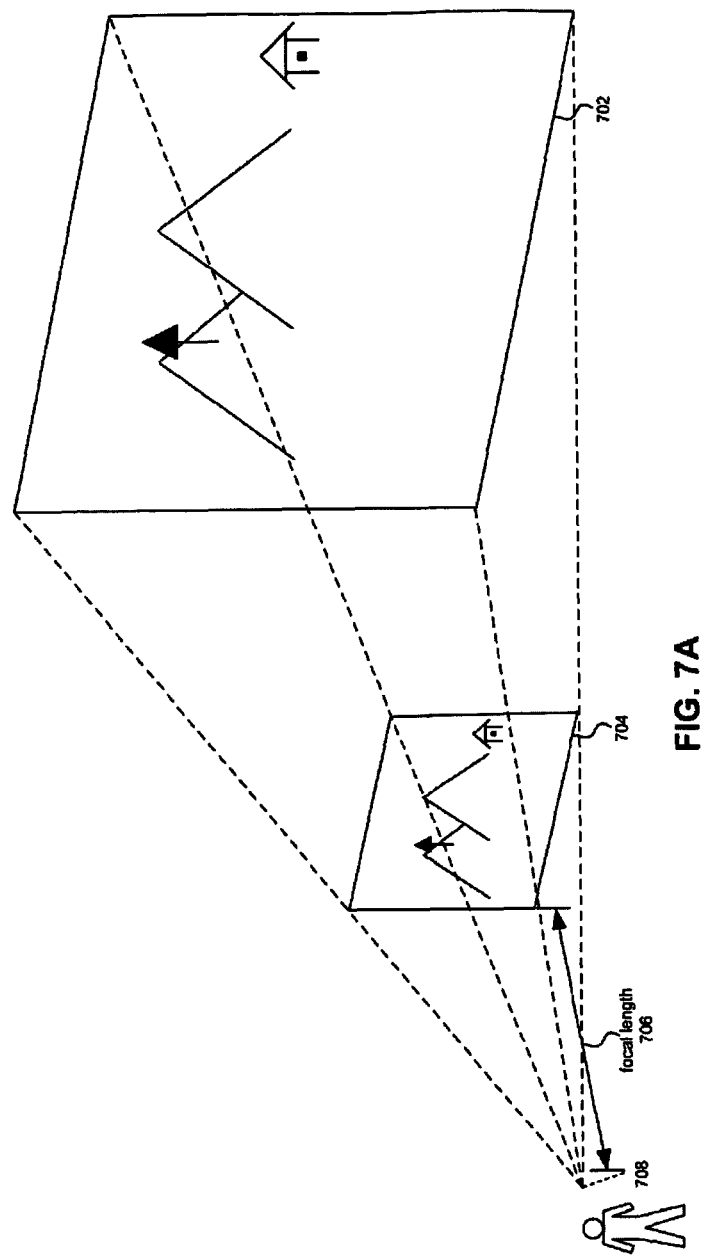
FIG. 7A illustrates how a photo placemark object may be positioned in a three dimensional map according to an embodiment of the invention.

FIG. 7A is a how a photo placemark object may be positioned in a three dimensional map. In FIG. 7A, the position and orientation of a photo placemark object 704 is such that a particular condition is met. When a virtual camera is placed at a position 708 normal to the photo placemark object's surface, at a distance of the focal length of the camera that took the photo, photo placemark object 704 overlays the same area on the three dimensional map. The photo placemark object's position and orientation may be set manually, and thus it may not be exact. This example is illustrative and not meant to limit the present invention. As mentioned earlier, a virtual camera may fly to position when a user enters photo navigation mode.

Figure 7B:
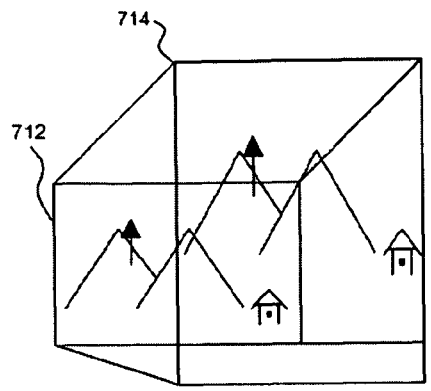
FIGS. 7B-7D illustrate an exemplary frustum used in a photo navigation mode according to an embodiment of the invention.
Figure 7C:
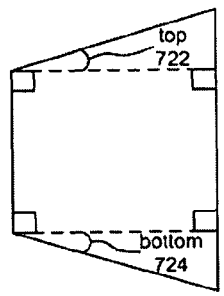
Figure 7D:
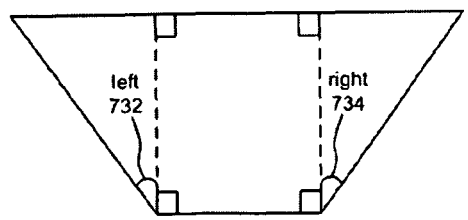

FIGS. 7B-7D illustrate a frustum that may be used in photo navigation mode. A frustum is the portion of a solid, in this case a pyramid, which lies between two parallel planes. FIG. 7B shows an example frustum. The image is smaller in the near part 712 of the frustum, and it gets larger in the further part 714 of the frustum. FIGS. 7C and 7D show the angles of the frustum's clipping planes. FIG. 7C is a view from the side of the frustum, and it shows the angles of top clipping plane 722 and the bottom clipping plane 924. FIG. 7D is a view from the top of the frustum, and it shows the angles of left clipping plane 732 and right clipping plane 734.

The frustum shown in FIGS. 7B-7D may be used, for example, in navigation operations while in photo navigation mode as discussed above with reference to FIGS. 1A and 2B. The angles of the frustum's clipping planes may be specified in a KML tag as discussed with reference to FIG. 5.

When a user enters photo navigation mode, the GIS may adjust the frustum of the virtual camera to match the frustum specified in the KML tag. In the way, the virtual camera has the same field of view of the camera that took the photo.

Figure 8:
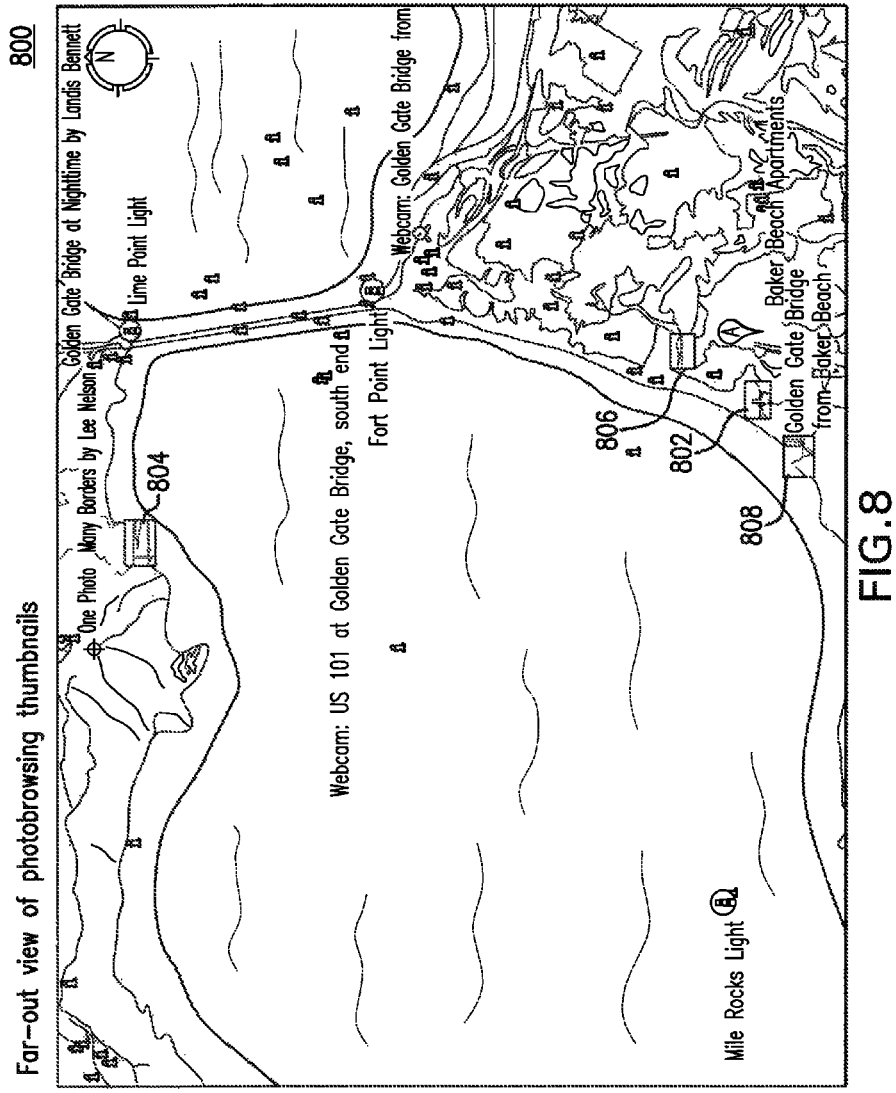
FIG. 8 illustrates exemplary photo placemark objects at a greater distance than shown in FIG. 1.

FIG. 8 shows an example user interface view 800 that displays photo placemark objects as thumbnail icons. In an embodiment, photo placemark objects may be displayed as thumbnail icons when the virtual camera is at a distance away from a location of the photographic images. In one example, photo placemark objects may be displayed as thumbnail icons when the photographic images would occupy less than or equal to five percent of the area of a display area. User interface view 800 includes thumbnail icons 802, 804, 806, and 808. Selecting a thumbnail icon, such as thumbnail icon 802, may display an information bubble.

Figure 9:
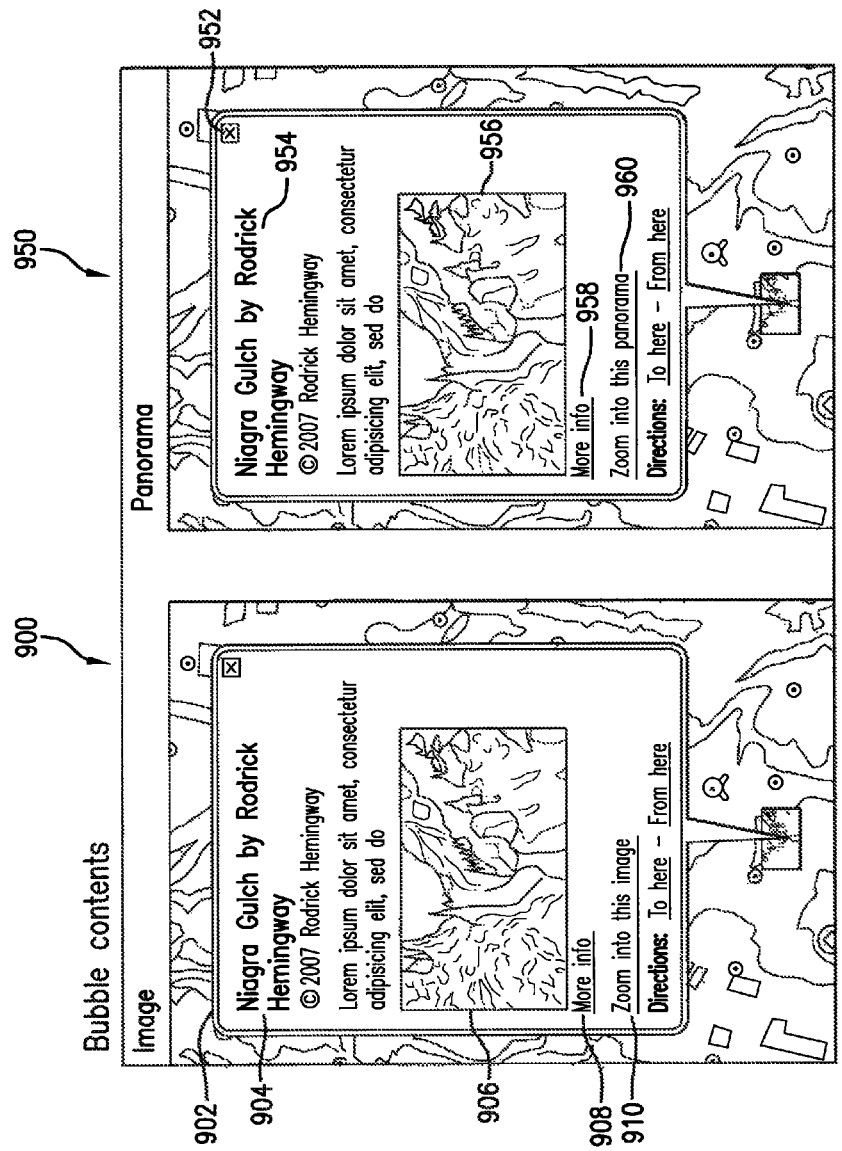
FIG. 9 is an example user interface view that illustrates information bubbles.

FIG. 9 shows example user interface views 900 and 950 that illustrate information bubbles. User interface views 900 and 950 include information bubbles 902 and 952 respectively. Information bubble 902 includes a title 904, a graphic 906, a information link 908, and a zoom link 910. Similarly, information bubble 952 also includes a title 954, a graphic 956, a information link 958, and a zoom link 960. Graphics 906 and 956 may be lower resolution versions of photographic images. When a user selects zoom link 910, the user is flown into a flat image in photo navigation mode. Selecting zoom link 960, on the other hand, flies the user into a panoramic image in photo navigation mode. The panoramic image may, for example, be rendered onto a cylinder or a sphere.

4. Photo Navigation Mode Using a Image Pyramid

When the user flies into photo navigation mode, the image may appear as shown in FIG. 1B. As is discussed in this section, the photo may have an associated image pyramid.

Figure 10C:
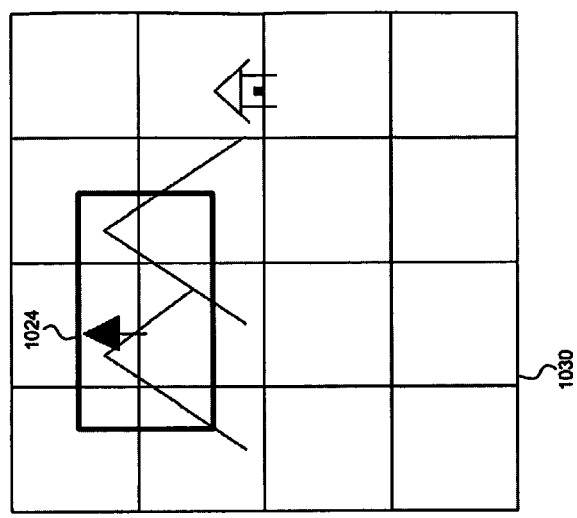
FIGS. 10A-10C illustrate level of an example image pyramid according to an embodiment of the invention.
Figure 10B:
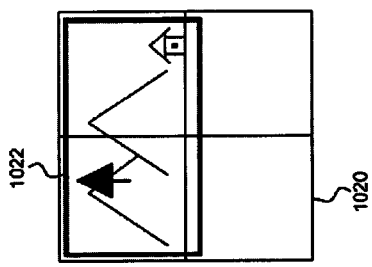
Figure 10A:
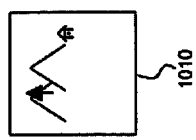

FIGS. 10A-10C illustrate an example image pyramid according to an embodiment of the invention. An image pyramid is used to render images at different resolutions. An image pyramid is a type of quad node tree. A quad node tree is a data structure organized into nodes. Each node contains drawable data and up to four references to other quad nodes. With image pyramids, the drawable data is an image tile. The image tile of a child node in an image pyramid may be a portion of the image tile of the parent node with a higher resolution. In examples, the image pyramid may be constructed as the user enters photo navigation mode, or it may be constructed in advance when the KML is determined as is described in section five.

The image pyramid may be constructed by dividing the high-resolution input photo into square tiles (with a power of two size such as 256×256 or 512×512). If necessary (when the image sizes are not multiples of the tile size), edge tiles are added as the last row and column of tiles. The high-resolution input photo is then minified (shrink each dimension by two). The same process as above can be repeated, until the minified image is smaller than a single tile. The number of levels in the image pyramid is defined by the maximum of either $\log_2$ (width/tile size) or $\log_2$(height/tile size).

The example image pyramid in FIGS. 10A-10C has three levels of detail. These levels are level 1010 (see FIG. 10A), level 1020 (see FIG. 10B), and level 1030 (see FIG. 10C). Each of these levels is formed, for example, using a high resolution image or photo. The resolution of the photo may be higher than the resolution of the user interface's display. Level 1020 is of a lower resolution than level 1030. Similarly, level 1010 is of a lower resolution than level 1020. In examples, the image tiles may be stored locally or on a remote server accessible over one or more networks such as the Internet.

In operation, as the user enters photo navigation mode, for example, the first image displayed may be the image at level 1010. If the user zooms in on the upper left corner of the image, the image tiles necessary to display image portion 1022 would be displayed. In an embodiment, the user can pan the image, in which case other neighboring tiles from level 1020 would be loaded. If the user further zooms in on image portion 1022, tiles necessary to display image portion 1024, for example, would be loaded. This example is meant for illustrative purposes only, and it is not meant to limit the present invention.

Tiles may be identified by their x and y coordinates in the photo and their level in the image pyramid. In one example, the image pyramid may be constructed and stored such that its tiles are accessible at the URL http://server.company.com/bigphoto/$[level]/row_$[x]_column_$[y].jpg, where $[level] is the level of the tiles in the image pyramid, $[x] is the row of the tile in the photo, and $[y] is the column in the photo. In that example, to request the tile in row 2 column 1 at level 3, the client would fetch the following URL: http://server.company.com/bigphoto/3/row_2_column_1.jpg.

As discussed in embodiments, a GIS displays photo placemark objects represented as KML on a three dimensional model of the Earth. Selecting a photo placemark object may cause the GIS to display the photo in a photo navigation mode. In this way, an ability to incorporate photographic images taken by users into the three dimensional model of the Earth is provided. Such incorporation can make the three dimensional model of the Earth even more rich, and can enhance users' experience and increase sharing of even more information. The next section discusses a method for registering photographic images within the three dimensional model of the Earth 5. Registering Photographic Images This section describes a method for registering a photographic image in a three dimensional model of the Earth. First, this section describes a method for registering a photographic image with respect to FIG. 11. Second, this section describes exemplary KML code that may result from registration of the photographic image with respect to FIGS. 12A-B and 13.

Figure 11:
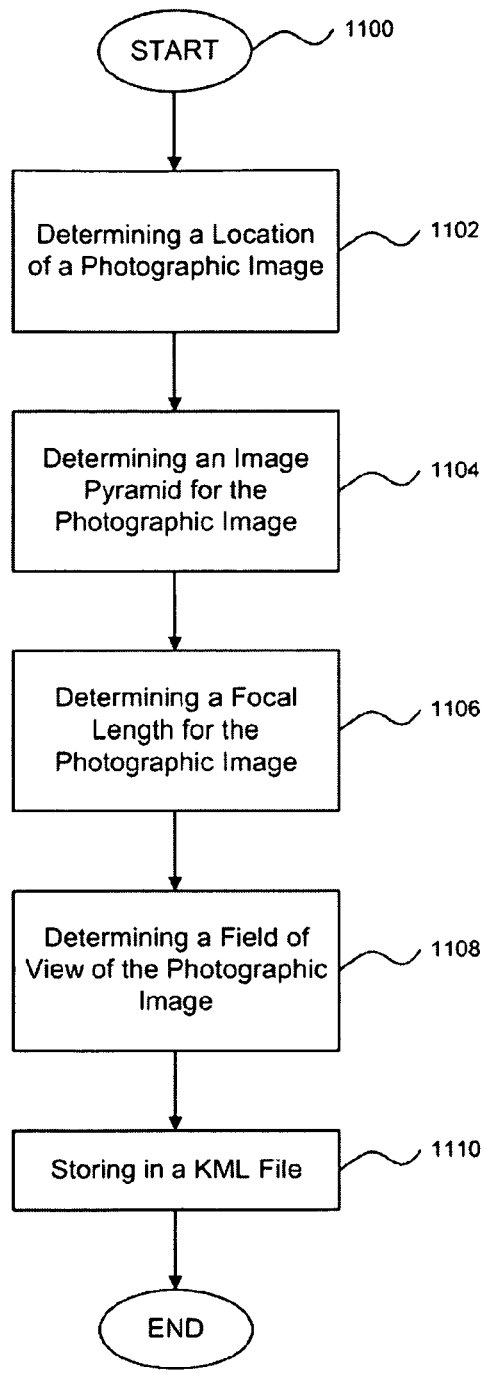
FIG. 11 is a flowchart illustrating an exemplary process by which a KML file representing a photo placemark is determined according to an embodiment of the invention.

FIG. 11 is a flowchart illustrating a method 1100 for determining a KML file representing a photo placemark according to an embodiment of the invention (steps 1102-1110). Method 1100 begins by determining a location of a panoramic image at step 1102. In this step, the geographic coordinates and the orientation of the photographic image are determined. In one embodiment, a user may manually position and orient a virtual camera in a GIS to match a perspective of a photo. The GIS may provide a simple user interface which allows the user to tweak the orientation of the camera while displaying the photo on the screen. The photo can be made partially transparent so that both the Earth imagery and the photo are visible on the screen at the same time. The user can for instance match terrain features in the photo to the terrain data displayed in the GIS. Similarly, the GIS may provide a form to a user and determine location data by accepting a user input.

In another embodiment, to determine the location of photo the user can match points in the photo with points on terrain, building, and other geographic data in the GIS. With enough point matches, the orientation and position of the camera can be deduced and the photo can be geo-referenced. In a third embodiment, the matches may be determined automatically using a feature recognition and matching algorithm. One example feature recognition and matching algorithm known to those skilled in the art is Speeded Up Robust Features, described in Herbert Bay, Tinne Tuytelaars, Luc Van Gool, "SURF: Speeded Up Robust Features", Proceedings of the Ninth European Conference on Computer Vision, May 2006.

Some location information may exist in the EXIF header of the photographic image. If location information is available, it may be parsed out of the EXIF header and used for some or all of the location data determined at step 1102. At step 1104, an image pyramid is determined for the photographic image. Constructing an image pyramid is discussed above with respect to FIG. 10.

At step 1106, a focal length for the photographic image is determined. As discussed earlier, the focal length may be used to position a virtual camera entering photo navigation mode. In an embodiment, the focal length may be parsed from the EXIF header of the image file.

In addition to the focal length, the field of view of the photographic image is determined at step 1108. The field of view values are described with respect to FIGS. 7B-D. In an embodiment, the field of view values may be determined according to the EXIF header. The EXIF headers may include a focal length value, and an image size and resolution in dpi, and a focal plane resolution in dots per inch (dpi). Based on those values the field of view values may be approximated. In another embodiment, the camera make and model may be extracted from the EXIF headers. The camera make and model may then be used to look up approximate field of view values. If insufficient information is available in the EXIF headers to calculate the field of view values, a user may edit the values.

Once a location, focal length, field of view and, optionally, an image pyramid for the photo are determined, the values are stored in a KML file at step 1110. The KML file may be stored locally or may be shared with other users across one or more networks, such as the Internet. Photo placemarks may also be shareable through a website, such as a PicasaWeb™ service available from Google, Inc., for example.

FIGS. 12A-B illustrate exemplary KML code 1202 and 1204 to store photo placemark objects according to an embodiment of the invention. As described above with respect to FIG. 5, the photo overlay elements in KML code 1202 include a ViewVolume element specifying the view frustum. In this example, KML code 1202 does not have an ImagePyramid element and, as a result, the image is displayed at a single resolution. On the other hand, KML code 1204 in FIG. 12B shows an example where a KML code PhotoOverlay element does have an ImagePyramid element specifying an multi-resolution image pyramid.

FIG. 13 illustrates exemplary KML schema for a photo placemark object according to an embodiment of the invention. The interactive GIS described herein supports a number of display features for rich presentation of GIS data. In an embodiment, all of the features supported by the GIS can be described in KML. KML is a hierarchical XML-based grammar and file format for modeling, storing, and displaying geographic features such as points, lines, images, and polygons for display by the client. KML controls elements that appear in the user interface and the places panel (shown in FIG. 1).

The KML tag that represents a photo placemark object may be referred to as a PhotoOverlay tag. A KML schema portion 1302 defines several elements of the PhotoOverlay tag. These elements include a shape element, a ViewVolume element, and an ImagePyramid element.

The shape element defines the shape on which to render the surface. A KML schema portion 1304 defines several different types of shapes including a rectangle, a cylinder, and a sphere.

A KML schema portion 1306 defines a ViewVolume element. The ViewVolume element contains sub-elements necessary to construct a frustum. The sub-elements include distance, leftFov, rightFov, bottomFov, and topFov. The distance sub-element defines the distance from center of frustum to photo overlay. The leftFov, rightFov, bottomFov, and topFov define the angles of the frustum's left, right, bottom and top clipping planes respectively.

A KML schema portion 1308 defines an ImagePyramid element. The ImagePyramid element contains sub-elements necessary to construct an image pyramid. An image pyramid is a type of quad node tree wherein the drawable data within each quad node is an image portion. Child nodes in the image pyramid may be portions of the parent node with a higher resolution. The sub-elements include tileSize, width, and height. The tileSize sub-element defines the number of tiles to span across an image. The width sub-element defines the width of the image and the height sub-element defines the height of the image. The tileSize, width, and height sub-elements may be powers of two.

Examples above refer to KML; however, this is intended to be illustrative and not necessarily limit the invention. Other languages or specifications used in supporting a GIS may be used.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for displaying one or more photographic images at a location within a three-dimensional (3D) geographic environment of a geographic information system, comprising:

(a) displaying a three-dimensional geographic environment from data received from a geographic information system, wherein the three-dimensional geographic environment represents a planetary body, and wherein the data received from the geographic information system includes the one or more photographic images and location data associated with each photographic image, the location data identifying a location in the three-dimensional environment that corresponds to a geolocation where the associated photographic image was captured;

(b) when a location identified by the location data associated with a particular photographic image of the one or more photographic images is within a field of view of, and at a first distance from, a virtual camera of the three-dimensional geographic environment, displaying the particular photographic image on a photo placemark object represented as a billboard at the location within the three-dimensional geographic environment, wherein the first distance is determined, at least in part, based on whether the particular photographic image, if displayed on the photo placemark object, occupies more than five percent of an image plane derived from the virtual camera; and (c) when the location identified by the location data associated with the particular photographic image is within a field of view of, and at a second distance from, the virtual camera of the three-dimensional geographic environment, displaying an icon representing the particular photographic image on the photo placemark object at the location, the second distance being greater than the first distance, wherein the second distance is determined, at least in part, based on whether the particular photographic image, if displayed on the photo placemark object, occupies five percent or less of the image plane derived from the virtual camera; and (d) displaying the photographic image in greater detail, in response to a computer input event.

2. The method of claim 1, wherein the displaying (b) comprises displaying the photographic image rendered onto a shape.

3. The method of claim 2, wherein the displaying (b) comprises displaying the photographic image rendered onto a rectangle, cylinder, or sphere.

4. The method of claim 1, wherein the displaying (d) comprises zooming the photographic image in response to a computer input event.

5. The method of claim 4, wherein the zooming comprises displaying a different resolution tile of an image pyramid constructed from the photographic image.

6. The method of claim 1, wherein the displaying (d) comprises adjusting a field of view of the virtual camera to match a field of view of the photographic image.

7. The method of claim 1, wherein the location data includes a position, and the displaying (b) comprises displaying the photographic image at a position corresponding to geographic coordinates associated with the photographic image.

8. The method of claim 7, wherein the location data further includes orientation, and the photographic image includes orientation data and the displaying (b) comprises displaying the photographic image at a location corresponding to the orientation data associated with the photographic image.

9. The method of claim 8, wherein the orientation data includes heading, tilt and roll values, and the displaying (b) comprises displaying the photographic image at a location corresponding to the heading, tilt and roll values associated with the photographic image.

10. The method of claim 1, wherein the photographic image includes an EXIF header and displaying the photographic image in greater detail includes (i) positioning the virtual camera normal to a surface of the photographic image at a distance corresponding to a focal length, the focal length determined according to the EXIF header of the photographic image.

11. A geographic information system for displaying one or more photographic images at a location within a three-dimensional (3D) geographic environment of the geographic information system, comprising:

a graphical user interface module configured to display a three-dimensional geographic environment from data received from a geographic information system, wherein the three-dimensional geographic environment represents a planetary body, and wherein, the data received, from the geographic information system includes the one or more photographic images and location data associated with each photographic image, the location data identifying a location in the three-dimensional environment that corresponds to a geolocation where the associated photographic image was captured;

a placemark processor configured to:

when a location identified by the location data associated with a particular photographic image of the one or more photographic images is within a field of view of, and at a first distance from, a virtual camera of the three-dimensional geographic environment, send a signal to display the photographic image on a photo placemark object represented as a billboard at the location, wherein the first distance is determined, at least in part, based on whether the particular photographic image, if displayed on the photo placemark object, occupies more than five percent of an image plane derived from the virtual camera; and when the location identified by the location data associated with the particular photographic image is within a field of view of, and at a second distance from, the virtual camera of the three-dimensional geographic environment, send a signal to display an icon representing the photographic image on the photo placemark object at the location, the second distance being greater than the first distance, wherein the second distance is determined, at least in part, based on whether the particular photographic image, if displayed on the photo placemark object, occupies five percent or less of the image plane derived from the virtual camera; and a photo navigator that, in response to a user input, is configured to send a signal to display the photographic image in greater detail.

12. The system of claim 11, wherein the photographic image is rendered on a shape.

13. The system of claim 12, wherein the shape is a rectangle, a cylinder, or a sphere.

14. The system of claim 11, wherein the location data includes orientation data associated with the photographic image.

15. The system of claim 14, wherein the orientation data includes heading, tilt, and roll values.

16. The system of claim 11, wherein the photo navigator zooms within the photographic image in response to a computer input event.

17. The system of claim 16, wherein the photo navigator displays a different resolution tile of an image pyramid constructed from the photographic image to zoom within the photographic image.

18. The system of claim 11, wherein the photo navigator adjusts a field of view of the virtual camera to match a field of view of the photographic image.

19. The system of claim 11, wherein the placemark processor sends a signal to display the photographic image at a location corresponding to geographic coordinates associated with the photographic image.

20. The system of claim 11, wherein the photo navigator positions the virtual camera normal to a surface of the photographic image at a distance corresponding to a focal length, the focal length determined according to an EXIF header of the photographic image.

* * * * *

UNITED STATES PATENT AND TRADEMARK OFFICE
CERTIFICATE OF CORRECTION

PATENT NO. : 8,487,957 B1
APPLICATION NO. : 12/129520
DATED : July 16, 2013
INVENTOR(S) : Bailly et al.

It is certified that error appears in the above-identified patent and that said Letters Patent is hereby corrected as shown below:

Title Page 2, item (56) line 2, under References Cited, Other Publications, reference to Torniai et al., "Sematic Web Applications and Perspectives" should read --Semantic Web Applications and Perspectives--; and In the Claims:

Column 17, lines 53-54, "wherein, the data received, from" should read --wherein the data received from--.

Signed and Sealed this
Twenty-sixth Day of November, 2013

Margaret A. Focarino
*Commissioner for Patents of the United States Patent and Trademark Office*